United States Patent [19]

Ruehle

[11] 4,206,509

[45] Jun. 3, 1980

[54] METHOD OF ENHANCING SEISMIC REFLECTION SIGNALS FOR NONSURFACE-CONSISTENT STATIC TIME SHIFTS

[75] Inventor: William H. Ruehle, Duncanville, Tex.

[73] Assignee: Mobil Oil Corporation, New York, N.Y.

[21] Appl. No.: 883,010

[22] Filed: Mar. 3, 1978

[51] Int. Cl.² .............................................. G01V 1/36
[52] U.S. Cl. ...................................... 367/42; 367/41; 367/50
[58] Field of Search ................ 340/15.5 TC, 15.5 CC, 340/15.5 DP, 15.5 SC, 15.5 TA

[56] References Cited
U.S. PATENT DOCUMENTS

| | | | |
|---|---|---|---|
| 3,539,982 | 11/1970 | Hileman et al. | 340/15.5 TC |
| 3,550,074 | 12/1970 | Kerns et al. | 340/15.5 TC |
| 3,638,177 | 1/1972 | Lindblade et al. | 340/15.5 TC |
| 3,644,882 | 2/1972 | Burg | 340/15.5 TC |
| 3,714,621 | 1/1973 | Waters | 340/15.5 TC |
| 3,731,269 | 5/1973 | Judson et al. | 340/15.5 TC |
| 3,794,827 | 2/1974 | Widess | 340/15.5 TC |
| 4,069,471 | 1/1978 | Silverman | 340/15.5 TC |

*Primary Examiner*—Howard A. Birmiel
*Attorney, Agent, or Firm*—C. A. Huggett; William J. Scherback

[57] ABSTRACT

In common depth point (CDP) seismic exploration, a pilot trace is produced from the stacked trace for each CDP set of traces. The pilot trace is crosscorrelated with each trace of the CDP set during selected time windows. The crosscorrelation time shifts are applied to each trace of the CDP set. The time shifted traces of each CDP set are stacked to form a static corrected seismic record section.

10 Claims, 3 Drawing Figures

METHOD OF ENHANCING SEISMIC REFLECTION SIGNALS FOR NONSURFACE-CONSISTENT STATIC TIME SHIFTS

BACKGROUND OF THE INVENTION

This invention relates to seismic exploration and more particularly to a method for improving velocity determinations from the recorded seismic data by correcting for static time shifts between seismic traces.

In seismic exploration, seismic energy is generated by a source located at or near the surface of the earth, is reflected from subsurface interfaces between layers of the earth, and is received by a spread of seismic receivers on the surface of the earth. The receiver signals are conventionally gathered, stacked, and recorded in the form of a suite of common depth point (CDP) seismic traces as illustrated in FIG. 1. From these recorded CDP seismic traces the subsurface interval velocities can be determined. Such a CDP data gathering and recording technique and a continuous velocity determination technique are disclosed in U.S. Pat. No. 3,651,451 to William H. Ruehle. An accurate velocity determination is quite important in the interpretation of the nature and extent of the subsurface layering.

Two time corrections must be applied to the received seismic signals before they are stacked and recorded as CDP traces. First, each of the traces must be corrected for what is commonly referred to as normal moveout. The traveltimes of the seismic pressure wave from the seismic source to the seismic receivers differ in accordance with the differing spacing of the receivers from the source. To correct for this, a normal moveout correction which is related to the distance from the source to each receiver is applied to the seismic signal recorded by each such receiver.

Second, the top portion of the earth's crust, referred to as the surface layer, has varying thickness and velocity characteristics from place to place which introduce an unknown time shift into each recorded seismic signal. Such a time shift is referred to as a "static error" or "static time shift," and the correction necessary to correct a seismic signal for such an error is called "static correction" or more simply "statics."

Static errors can occur in either a surface-consistent fashion or in a nonsurface-consistent fashion. Where the surface layer is generally shallow or thin, the static shifts along the seismic traces are relatively constant from trace to trace. In this case, the traces can be shifted by a constant time increment to a common datum plane below the surface layering so as to make the traces appear to have been recorded at detectors located on the datum plane in response to acoustic energy generated by a source located on the datum plane. However, in those areas where the surface layering is deep or thick and with variable thickness or velocity, the static errors are not consistent from trace to trace.

The present invention is particularly useful in enhancing the velocity determination of the recorded seismic data in the presence of a deep and variable thickness surface layering by providing for a method for determining the nonsurface-consistent static errors created by such surface layering and applying time variant shifts to the received seismic signals to correct for such nonsurface-consistent static errors prior to CDP stacking and trace recording.

SUMMARY OF THE INVENTION

The present invention provides a method for enhancing primary seismic reflection signals recorded in the form of common depth point seismic traces by the removal of nonsurface-consistent static time shifts. The recorded common depth point seismic traces are stacked to produce a seismic record section. The stacked traces are selectively averaged in the direction of a reflection dip to produce a pilot section of at least one pilot trace, such pilot trace being identified with those common depth point seismic traces which have been included in the selective averaging. Time windows bracketing at least one reflection signal on each pilot trace of the pilot section are selected. That portion of each pilot trace of the pilot section within the selected time window is crosscorrelated with the portions of the recorded seismic traces of the common depth point seismic traces identified with each pilot trace and falling within the same time windows to determine the static time shifts. The resulting static time shifts are applied to the common depth point seismic traces. These time shifted traces in each common depth point set are stacked to produce a static corrected seismic record section.

In a further aspect, the time shifts applied to each common depth point seismic trace are applied to the sample points located at the centers of the time windows, and interpolated values of the time shifts between time windows are applied to intermediate sample points along the traces between the centers of the time windows. Successive time windows along a pilot trace may overlap and also be time variant.

In a still further aspect, the averaging of the stacked traces of the record section to produce a pilot section may be carried out in several methods. In one method, all of the stacked traces are averaged in the direction of a reflection dip to produce a single-trace pilot section. In another method, the stacked traces are averaged to select groups in the direction of a reflection dip to produce a multitrace pilot section, a pilot trace being produced for each select group. In a further aspect of this method, the select pilot traces of the multitrace pilot section are linearly interpolated to produce additional pilot traces corresponding to each stacked trace of the record section not represented by one of the select pilot traces, the select pilot traces and the additional pilot traces comprising the multitrace pilot section.

DESCRIPTION OF THE PREFERRED EMBODIMENTS

The present invention is directed toward the correction of seismic signals for nonsurface-consistent statics prior to conventional CDP stacking and trace recording.

Figure 1:
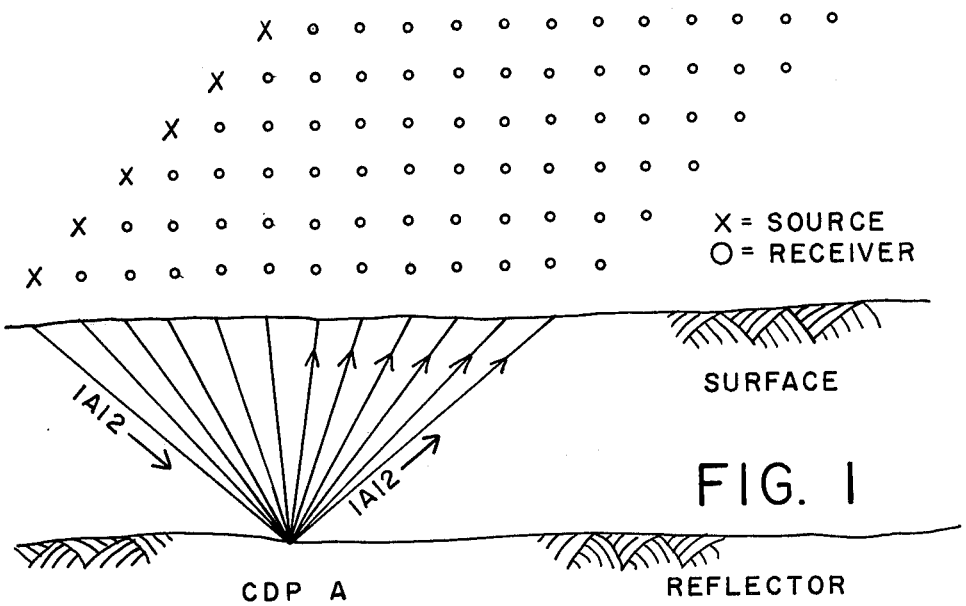
FIG. 1 illustrates a seismic exploration technique.
Figure 2:
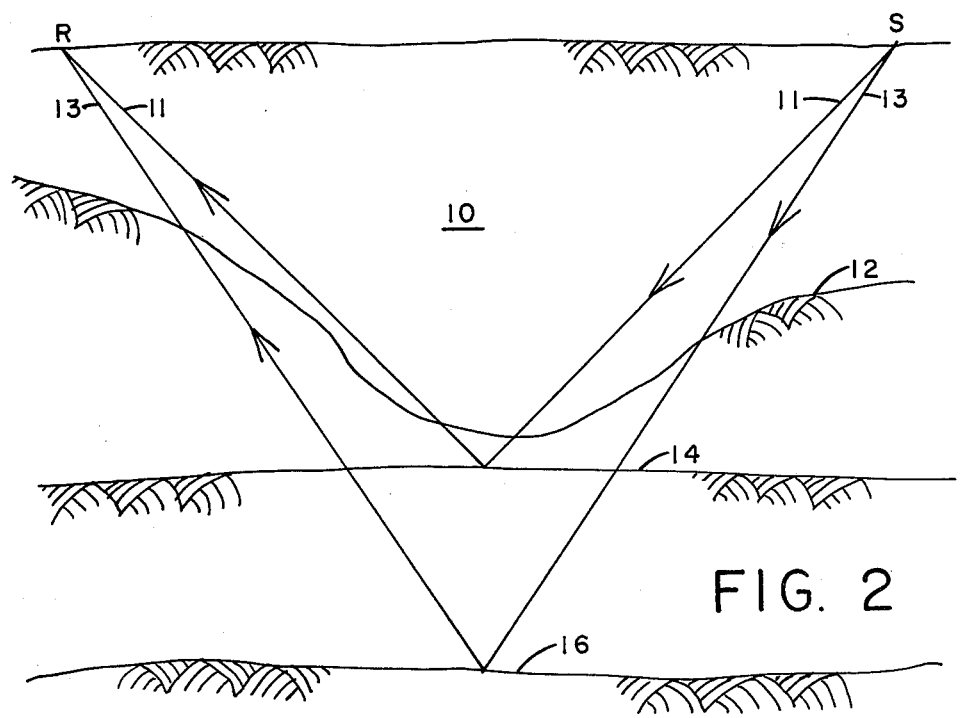
FIG. 2 illustrates a common depth point set of seismic energy raypaths of the technique of FIG. 1.

Referring to FIG. 2 it can be seen that the path traveled by each seismic pressure wave from the seismic source S to the receiver R through the variable thickness surface layer 10 is not duplicated for succeedingly deeper reflectors. More particularly, upon the firing of the source S, the seismic pressure wave traveling the path 11 traverses a greater portion of the surface layer 10 immediately above the variable curvature interface 12 in reflecting from the subsurface interface 14 to the receiver R than does the seismic pressure wave traveling the path 13 in reflecting from the deeper subsurface interface 16 to the receiver R. It can therefore be seen that hyperbolic moveout of the seismic reflections varies with depth of the reflectors.

When the interface curvatures, such as at 12, occur over distances which are short with respect to the source-to-receiver offset distance, there is a resultant series of distance-dependent time shifts varying with reflection depth, such time shifts decreasing in magnitude as the depth of the reflections increases. Application of the incorrect stacking velocity to CDP sets of seismic data results in incorrectly aligned reflections where the sense and magnitude of the shifts vary with reflection depth. Even when the correct velocity is applied, a reflection pulse stretching occurs that is proportional to trace offset and inversely proportional to reflection depth. Misstacking of the CDP traces occurs in either case. Consequently, pulse distortion is associated with all but the deepest reflections.

This nonsurface-consistent statics problem can be separated into two elements. The first is those time shifts which appear on each trace of a CDP stacked section by:

$$S_S = S_{st} + S_{pr} \tag{1}$$

where, $S_S$ = time shift on CDP stacked section,
$S_{st}$ = component of time shift on CDP stacked section due to subsurface structure (i.e., reflections), and
$S_{pr}$ = component of time shift on CDP stacked section due to misalignment within the CDP set which, when stacked, mislocates the reflection (i.e., statics).

Both of these components are time and space variant. It is desirable to preserve the $S_{st}$ component since it represents the subsurface structure, while it is desirable to remove the $S_{pr}$ component since it creates the problem of the misstacked section.

Figure 3:
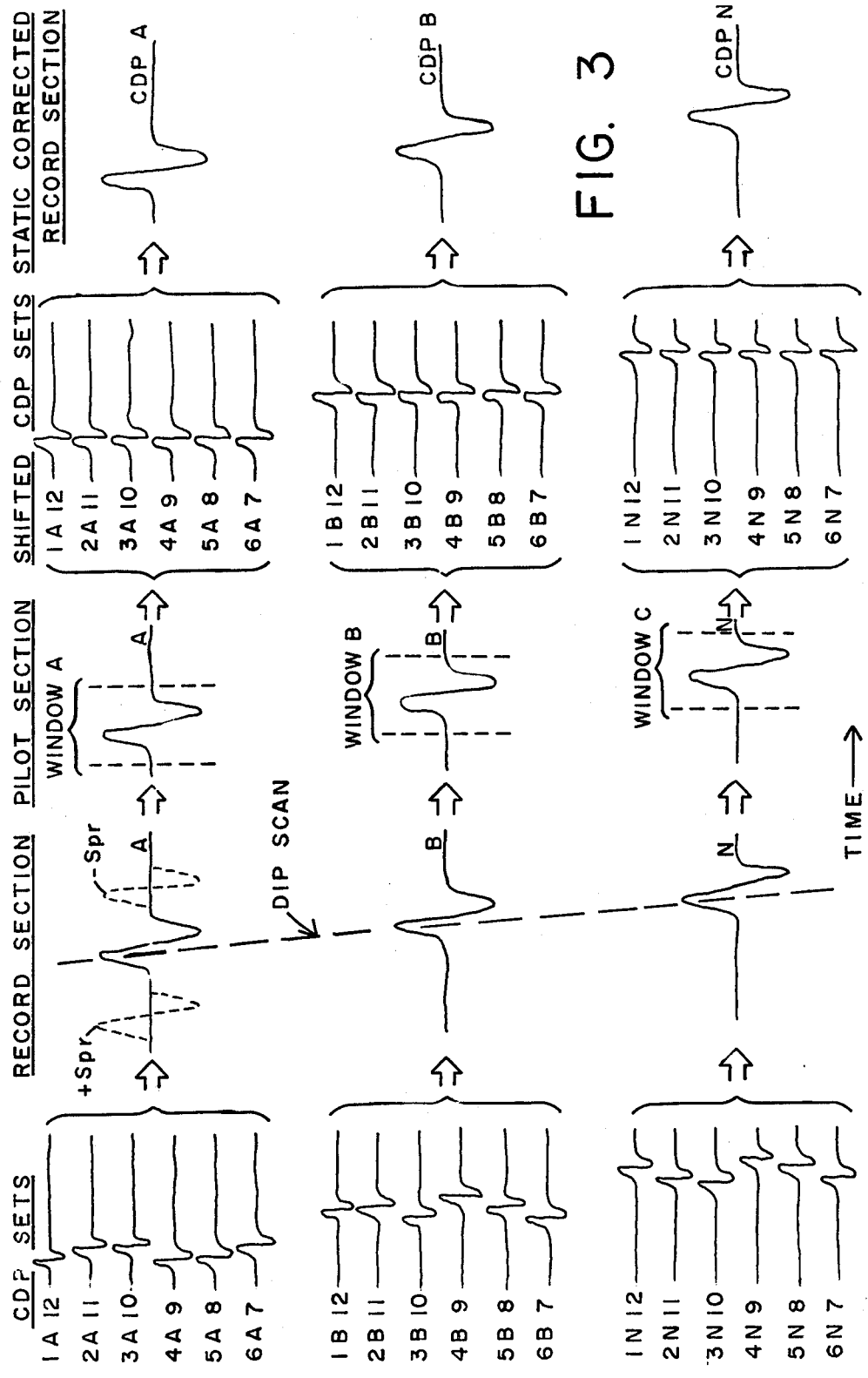
FIG. 3 is a flow sheet depicting the process of the invention for correcting seismic traces for nonsurface-consistent static errors attritutable to a variable thickness surface layer of the type shown in FIG. 1.

It is therefore a specific aspect of the present invention to provide a method for removing or suppressing this static component $S_{pr}$. In accordance with this aspect, there is illustrated the flow chart of FIG. 3 depicting each step of the invention. Initially, seismic signals recorded as normal moveout corrected CDP sets A through N are stacked to form a record section. For example, normal moveout corrected traces 1A12 through 6A7 for a common depth point A are stacked to form CDP record trace A. Traces 1B12 through 6B7 for a common depth point B are stacked to form CDP record trace B. Similar traces for all N common depth points are stacked to form CDP record traces.

Illustrated on the CDP record trace A of FIG. 3 are variations in the location of the primary seismic reflection for misalignment within the CDP set A of traces due to the static shift $S_{pr}$, such variation being both time and space variant. It is the specific feature of the present invention to remove or eliminate such misalignment.

Initially, a pilot section is estimated by the selective averaging of the stacked traces of the CDP record section in the direction of a reflection dip, each trace of the pilot section being identified with those particular sets of CDP seismic traces corresponding to the sets of selectively averaged stacked traces. Any number of pilot traces from 1 to t may be produced for each pilot section where the maximum number of pilot traces is equal to the number of CDP stacked traces of the record section. In producing a single-trace pilot section, all the stacked traces of the record section are averaged in the direction of a reflection dip. In producing a multi-trace pilot section of t pilot traces, the stacked traces are averaged in a plurality of t groupings in the direction of a reflection dip, the number of stacked traces in each grouping being equal to a number n. Each pilot trace is determined by performing a dip scan of n traces and then dropping trace 1 and picking up the n+1 trace. The resulting pilot traces are then stored as a pilot section until the complete stacked record section is processed. Pilot trace determination is given by:

$$P_j(t) = \operatorname*{Max}_{k} \sum_{j-n/2}^{j+n/2} \sum_{k=-ND/2}^{k=ND/2} S_j(t + kD)$$

which for each time is merely the maximum amplitude of a dip scan of ND dips each of kD sec per trace, over n traces. A pilot trace so determined guarantees that the existing structure will be preserved and averages out perturbations due to the misalignment component $S_{pr}$.

When t is a number less than the number of stacked traces of the record section, additional pilot traces may be produced corresponding to each of the stacked traces of the record section not represented by one of the t pilot traces. This is accomplished by means of a linear interpolation between the t pilot traces. In this case, the additional pilot traces and the t pilot traces comprise the multitrace pilot section.

After having determined a pilot section, arbitrary length time windows are selected for bracketing the strongest reflections along the resulting traces of the pilot section. Any number of time windows may be selected per trace and may be of equal length or time variant with respect to each other. Also, successive time windows may be overlapping. However, only one such time window is shown for each of the pilot traces A–N in FIG. 3 for purposes of simplicity. Those portions of the pilot traces within the selected time windows are crosscorrelated with each recorded trace in the corresponding CDP set within the same time windows. The resulting crosscorrelation time shifts with respect to the pilot trace are applied to each recorded trace. In this final step of applying the time shifts, the determined static time shifts for each trace are applied to the sample data points located at the centers of the time windows. When a plurality of time windows are selected on a pilot trace, interpolated values of the time shifts between centers of the time windows are applied to intermediate sample data points between the centers of the corresponding time windows on the recorded traces. The resulting time variantly shifted traces are stacked to produce the CDP traces A through N shown at the output of FIG. 3. These traces comprise the desired static corrected record section.

The above-described method of the present invention may be iterated any number of times until the static time shifts, $S_{pr}$, remaining in the static corrected record section after each iteration are reduced to a predetermined minimum level.

The foregoing-described process of the present invention may be carried out by means of conventional analog apparatus or by means of conventional digital apparatus. In a preferred mode, a field recorder is used to record the seismic signals, and a conventional general-purpose digital computer is utilized to carry out the process of the present invention on the recorded seismic signals. One particular computing system which is suitable for use is the Control Data Corporation Model 6600 Digital Computer, and includes the following input/output components:

Control Computer, 65K Memory
   6602 Console Display
   6681 Data Channel Converter
   405 Card Reader
   3447 Card Reader Controller
   501 Line Printer
   3256 Line Printer Controller A particular plotter that is suitable for use with this computing system is the Calcomp Plotter Model 763.

In the preferred embodiment of the present invention, the following program language is utilized for instructing the Control Data Corporation Model 6600 Digital Computer to carry out the steps of the flow chart of FIG. 3.

```
CALL DIN (REC, NOTR, NS, S, U1). Read from unit
    1 NOTR traces of NS samples each starting at record
    REC. Load into array S(I,J) when I=1 to NOTR,
    J=1 to NS.
DO 10 I=1, NTR
    CALL Pilot (S, NOTR, NS, BETA, GAMMA, PA, PD)
    CALL SHIFT (S, 1, NS, NOTR)
    CALL DOUT (PA, NS, O, UNIT 2)
    CALL DOUT (PD, NS, O, UNIT 2)
    CALL DIN (REC+NOTR+I−1, 1, NS, S, U1)
10 CONTINUE
```

Calculate pilot trace from stacked section using NOTR traces in S(I,J) array. Array is then shifted, dropping column I=1 and adding a new trace into column NOTR. Pilot amplitude array and dip arrays are stored on unit 2.

```
MTR=NTR−NOTR+1
DO 20 I=1, MTR
    CALL DIN (NCDP, 1, NS, PA, UNIT 2)
    CALL DIN (NCDP, 1, NS, PD, UNIT 2)
    CALL DIN (NCDP, NFOLD, NS, SS, U3)
    DO 30 J=1, NFOLD
        CALL CORR (PA, SS, NSHIFT, NS, NWIN, TST, TLP, WT, STAT, J, TT)
        CALL NTRPLT (STAT, TT, ST)
        CALL STATIC (SS, NS, J, ST)
        CALL DOUT (SS, NS, J, U4)
        DO 40 K=1, NS
            SUM=SUM(K)+SS(K,J)
40      CONTINUE
        CALL DOUT (SUM, NS, O, U5)
30  CONTINUE
20 CONTINUE
```

A pilot trace and a CDP set are read in. The pilot trace PA(·) is correlated against each trace in the CDP set SS(·,·) for a window NW in length, with NSHIFT lags beginning at TST, each window is overlapped TLP, and optionally weighted with array WT(·). The resulting correlation is searched for maximum value and the lag for this is stored in STAT(·).

The STAT(·) array contains shifts for each window center. This array is then linearly interpolated to each sample value between window centers using NTRPLT into array ST(·). The trace upon which correlation has been performed is then time variantly shifted by array ST(·) through subroutine STATIC. The corrected trace is read to unit 4, stacked, and read to unit 5.

DIN (R, N1, N2, S, U). Data in subroutine from Unit U to array S(N1, N2). Unit U is searched for record R.

Pilot (S, N1, N2, B, G, A, D). Pilot trace calculation subroutine which sums along dip lines of array S over N1 traces for N2 times between dips −B and +G. The dip which yields the largest |SUM| for each time is stored in D(·) and amplitude in A(·).

DOUT (A, N1, I, U). Read data in A(·) of N1 samples to unit U. If I≠0, A is a two-dimensional array of I columns.

SHIFT (A, N1, N2, N3). Shift data in A(·,I) from column I to I−N1 where there are N3 columns and N2 samples or rows.

CORR (A, B, N1, N2, N3, T1, T2, T3, W, ST, J). Cross-correlation subroutine which correlates a window of length N3 from A with a window of length N3+N1 of B(I,J) starting at time T1−N½+1. Each window overlaps by the amount T2. The maximum correlation value is found in each window and the corresponding shift stored in array ST(·). The window center is in array T3(·).

NTRPLT (A, B, C, SI). An interpolating subroutine which interpolates linearly between the value in A occurring at time B(·) to an equally sampled array C(·), SI is the sample interval of array C(·).

STATIC (A, N1, J, ST). A trace shifting routine which shifts the Ith sample of A(I,J) to A[I+ST(I), J], where I=1, ..., N1.

The foregoing program language is that commonly known as FORTRAN. Most FORTRAN programming involves looping, the repetition of groups of statements of varying parameters. The control statement involved is the "DO" statement. For a more detailed understanding of the use of FORTRAN statements, reference may be made to "Introduction to FORTRAN" by S. C. Plumb, McGraw-Hill Book Company, New York, N.Y. (1964).

I claim:

1. A method of enhancing primary seismic reflection signals recorded in the form of common depth point seismic traces by the removal of nonsurface-consistent static time shifts, comprising the steps of:

(a) stacking the seismic traces in each of a multiplicity common depth point sets of seismic traces to produce a seismic record section, (b) generating from the stacked traces of said record section in the direction of a formation dip at least one pilot trace, said pilot trace being identified with at least one of those sets of common depth point seismic traces, (c) selecting time windows for at least two reflection signals on each pilot trace, which time windows bracket their respective reflection signals, (d) crosscorrelating that portion of each pilot trace within the selected time windows with those portions of the common depth point seismic traces identified with each pilot trace and falling within the same time windows to determine separately static time shifts for each of said reflection signals in said common depth point seismic traces, (e) applying said static time shifts to said common depth point seismic traces, and (f) stacking the time shifted seismic traces in each common depth point set to produce a static corrected seismic record section.

2. The method of claim 1 wherein the step of generating said pilot trace includes selecting one of said stacked traces and averaging with adjacent stacked traces of said record section in the direction of formation dip to produce said pilot trace.

3. The method of claim 1 wherein the step of selectively averaging the stacked traces of said record section to produce said pilot section includes the averaging of the stacked traces in a plurality of t groupings in the direction of a formation dip to produce a multitrace pilot section of n pilot traces corresponding to t of said stacked traces.

4. The method of claim 3 wherein t is a number equal to the number of stacked traces of said record section.

5. The method of claim 3 wherein:
  (a) t is a number less than the number of stacked traces of the record section, and
  (b) additional pilot traces corresponding to each of the stacked traces of said record section not represented by one of said t pilot traces are produced by linearly interpolating between said t pilot traces, said t pilot traces and said additional pilot traces comprising a multitrace pilot section.

6. The method of claim 1 wherein said static time shifts are applied to said common depth point seismic traces at sample data points along said traces representing the center of the selected time window.

7. The method of claim 1 wherein steps (b) through (f) are iterated until the static time shifts remaining in the static corrected seismic record section after each iteration are reduced to a predetermined minimum level.

8. The method of claim 3 further comprising the steps of:
  (a) selecting a plurality of time windows for bracketing a corresponding plurality of reflection signals on each pilot trace of the pilot section,
  (b) applying the static time shifts for each time window selected to the common depth point seismic traces at those sample points along said traces representing the centers of the corresponding time windows,
  (c) applying interpolated values of the time shifts between the centers of the selected time windows for each pilot trace of the pilot section to the intermediate sample points between the centers of the time windows of the corresponding common depth point seismic traces, and
  (d) stacking the time shifted seismic traces in each common depth point set to produce a static corrected seismic record section.

9. The method of claim 8 wherein successive ones of said plurality of selected time windows are overlapping along a pilot trace.

10. The method of claim 8 wherein said plurality of time windows are time variant along a pilot trace.

* * * * *

UNITED STATES PATENT AND TRADEMARK OFFICE
CERTIFICATE OF CORRECTION

PATENT NO. : 4,206,509
DATED : June 3, 1980
INVENTOR(S) : William H. Ruehle

It is certified that error appears in the above-identified patent and that said Letters Patent are hereby corrected as shown below:

Starting with Column 4, Line 2 through Line 33, "$\tau$" and "$\eta$" should read --$\underline{\tau}$-- and --$\underline{\eta}$--.

Starting with Column 7, Line 12 through Line 25, "$\tau$" and "$\eta$" should read --$\underline{\tau}$-- and --$\underline{\eta}$--.

Signed and Sealed this

Nineteenth Day of August 1980

[SEAL]

Attest:

SIDNEY A. DIAMOND

Attesting Officer     Commissioner of Patents and Trademarks